Dec. 18, 1951    G. W. DAVIS    2,578,786
FISH LURE
Filed July 15, 1949
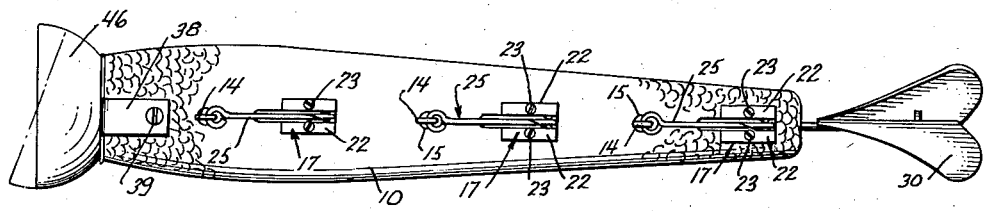
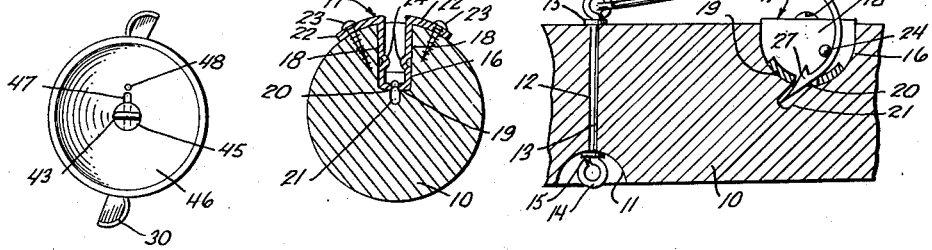
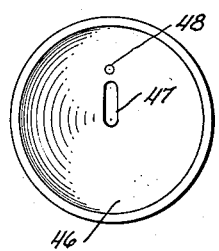
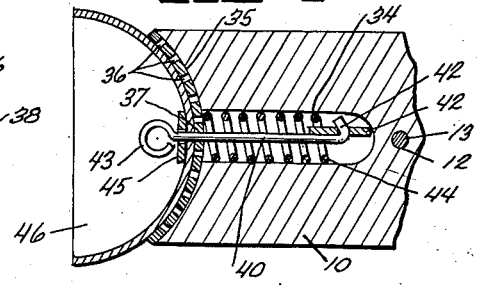
INVENTOR.
GEORGE W. DAVIS
BY
McMorrow, Berman + Davidson
ATTORNEYS Patented Dec. 18, 1951

2,578,786

UNITED STATES PATENT OFFICE 2,578,786

FISH LURE

George W. Davis, Gibson City, Ill.

Application July 15, 1949, Serial No. 104,857

3 Claims. (Cl. 43—42.22)

My invention relates to a fish lure for casting or trolling.

A primary object of the invention is to provide a casting or trolling lure having novel means to releasably hold fish hooks in fixed positions with their barbs exposed for readily snaring a fish striking the lure.

A further object is to provide a lure, which when struck by the fish while its hooks are fixedly held, is adapted to have the hooks pulled by the fish to free positions, where the hooks may partake of universal movement, so that the fish cannot readily escape.

A further object is to provide a lure of the mentioned type, and provided with novel adjustable means for regulating the depth at which the lure will run during trolling.

A still further object is to provide a fish lure which is simple, sturdy and cheap to manufacture, and which may have its hooks disposed so that the lure is safe to handle.

Other objects and advantages of the invention will be apparent during the course of the following description.

In the accompanying drawings, forming a part of this application, and in which like numerals are employed to designate like parts throughout the same, Figure 1 is a plan view of a fish lure embodying my invention, Figure 2 is an end elevation of the same, Figure 3 is a central vertical longitudinal section through the lure, Figure 4 is an enlarged transverse vertical section taken on line 4—4 of Figure 3, parts omitted, Figure 5 is an enlarged fragmentary horizontal section taken on line 5—5 of Figure 3, Figure 6 is a side elevation of an adjustable concave disc, Figure 7 is a similar view of a fixed apertured concave disc, and, Figure 8 is an enlarged fragmentary central vertical section showing a fish hook positioned with its barb protected.

In the drawings, where for the purpose of illustration is shown a preferred embodiment of the invention, the numeral 10 designates a plug or body portion which may be made of wood, plastics or other suitable material. The plug 10 is elongated, as shown, and tapers slightly toward its rear end or tail, to simulate the body of a minnow, or the like. The plug 10 may be circular in transverse cross section, Figure 4. The plug 10 is provided in its bottom with a plurality of longitudinally spaced recesses 11, and in the bottoms of the recesses 11 with parallel straight transverse bores 12, which extend entirely through the plug, as shown. Rotatably mounted within the bores 12 are swivel pins 13, including top and bottom eyes 14. Washers 15 may be provided as bearings, inwardly of the eyes 14.

The plug 10 is provided in its top and diametrically opposite the recesses 11, with a corresponding number of longitudinally spaced narrow recesses or grooves 16, and disposed in staggered relation to the recesses 11, Figure 3. The grooves 16 have circularly curved bottoms, as shown. Fixedly secured within the grooves 16 are generally U-shaped keeper plates 17, Figure 4, having opposed spaced sides 18, and arcuate bottoms 19, provided with central apertures 20, leading into small inclined recesses 21, formed in the plug 10, at the bottoms of recesses 16. The keeper plates 17 include integral lateral flanges 22 which engage the periphery of the plug 10 and are secured in place by screws 23, or the like. The sides 18 are inwardly punched near their vertical centers and rear edges to form laterally opposed spaced hook locking projections or beads 24, Figures 4 and 8, for a purpose to be described.

Fish hooks 25 have their shanks pivotally connected to the top eyes 14, as shown, and their curved necks 26 are adapted to enter between the sides 18 of the keeper plate, Figure 3, and engage beneath the locking projections 24, to be arranged in position for snaring or hooking a fish which strikes the lure. The curved necks 26 also engage the arcuate bottom 19, and the fish hooks are thus fixedly held with their barbs 27 extending upwardly beyond the periphery of the plug and fully exposed for snaring the fish, Figure 3. When the striking fish is snared or hooked by the exposed barbs 27, and struggles to free itself, the hooks 25 will be released from within the keeper plate 17 as soon as the fish exerts any substantial pull upon them, the projections 24 having only a very slight gripping action upon the neck 26 of the hook. When the fish pulls the hooks out of the keeper plates, they are of course free to swing upon the eyes 14, and due to the rotatable pins 13, the hooks have swiveled connection with the plug and are adapted to have universal movement, so that the fish cannot develop any leverage to free itself from the hook or hooks 25. With the hooks arranged in Figure 3, and fixedly positioned, when the fish strikes the lure and moves against the barbs 27, the barbs will readily penetrate in the manner that a sharp nail projecting from a board will penetrate the foot when stepped on. The hooks 25 may of course be readily pulled out of the keeper plates 17 by hand if it is desired to have the hooks free before casting or during trolling. As shown in Figure 8, the hooks 25 may have their barbs 27 turned inwardly and inserted through the openings 20 of bottoms 19 and into the recesses 21 of the plug. In this position, the projections 24 also serve to hold the curved necks 26 in place, and the hooks are fixedly held. This arrangement protects the sharp barbs 27 when the lure is in storage, and also makes the lure safe to handle.

At the rear or tail end of the plug 10 I provide an axially extending screw 28 having a head 29. Freely rotatably mounted upon the screw 28 is a vane or spinner 30 which tapers forwardly, and is formed so that it will rotate about the screw 28 when the lure travels forwardly through the water to simulate the tail of a minnow or the like. The vane 30 may have apertured knuckles 31 to receive the screw 28 and an opening 32 for receiving the head 29 and holding the vane against axial play.

The forward end of the plug 10 has a shallow spherically curved recess 33 and formed centrally in the bottom of this recess is a longitudinally inwardly extending opening 34 which extends to a point near and forwardly of the forward pin 13, Figure 3. Seated within the forward recess 33 is a spherically curved concave plate or disc 35 provided with a plurality of groups of radially spaced small apertures 36 and a slightly larger central aperture 37, Figure 7. Formed integral with the concave disc 35 are opposed rearwardly extending apertured flanges or extensions 38 which lie against the periphery of the plug and are rigidly secured thereto by screws 39 or the like. Slidably mounted within the central aperture 37 is a pull pin 40 which extends rearwardly into the opening 34 and is provided at its rear end with a lateral hook 41 engaging through the opening of a washer 42. At its forward end the pull pin 40 has an eye 43 adapted to have the fishing line attached thereto. An expansible coil spring 44 is disposed within the opening 34 and has its forward end engaging the fixed concave disc 35 and its rear end engaging the washer 42, Figure 5. This spring serves to resiliently bias the pull pin 40 rearwardly longitudinally. Mounted upon the pull pin 40 and arranged between the forward face of the concave disc 35 and a bearing washer 45, disposed rearwardly of the eye 43, is a forward adjustable spherically curved concave disc or plate 46 having a substantially larger diameter than the forward end of the plug 10 as shown. The concave disc 46 has a central radial slot 47, slidably receiving the forward portion of the pull pin 40, and the disc 46 is punched adjacent to the outer end of the slot 47 to form a single small radial projection or bead 48 for co-action with the small apertures 36 of the fixed disc 35. By virtue of this arrangement the forward concave disc 46 may be adjusted to numerous angular positions for causing the lure to travel in various paths while running through the water. By grasping the disc 46 and pulling it forwardly, the spring 44 will be compressed and the disc 46 is lifted from contact with the fixed disc 35. The bead 48 may then be brought into registration with any one of the small apertures 36. The radial slot 47 will permit universal adjustment of the disc 46. For example, with the disc 46 adjusted to the broken line position, Figure 1, the lure will run deep during trolling, and if it is adjusted to the broken line position, Figure 3, the lure will run shallow or near the surface of the water. Various intermediate positions of the disc 45 are possible, and the disc may also be adjusted laterally as desired, the bead 48 being engageable in any of the apertures 36. In effect, the disc 46 is substantially universally adjustable upon the fixed disc 35. The spring 44 always holds the disc 46 in the selected adjusted position. The spring 44 serves also as a shock absorber which will yield slightly when the line attached to the eye 43 is jerked. The washer 42 is large enough so that it cannot pass through the spring 44.

It is thus apparent that I have provided an extremely versatile fish lure, capable of use for various types of fishing, such as deep, shallow or zig-zag trolling, and casting.

It is to be understood that the form of the invention, herewith shown and described, is to be taken as a preferred example of the same, and that various changes in the shape, size and arrangement of parts may be resorted to, without departing from the spirit of the invention, or the scope of the subjoined claims.

Having thus described my invention, I claim:

1. A fish lure, comprising a body portion having a concave recess in its forward end and a longitudinal opening formed in the bottom of the concave recess, a fish hook connected with the body portion for catching the fish, a stationary concave disc mounted within the concave recess and having a central opening leading into the longitudinal opening and a plurality of apertures in its forward face, an adjustable concave disc seated upon the stationary disc and having a radial slot and a bead, a pin disposed within the longitudinal opening and extending through the central opening of the stationary disc and slot of the adjustable disc and having a line attaching eye forwardly of the adjustable disc, and a spring arranged within the longitudinal opening and connected with the pin, and serving to urge the pin inwardly for clamping the adjustable disc against the stationary disc, the bead being adapted to enter any one of the apertures of the stationary disc to effect the universal adjustment of the adjustable disc.

2. A fish lure comprising an elongated body having an axial bore extending inwardly from the forward end thereof and terminating at a point contiguous thereto, a forwardly facing stationary concave disc disposed transversely of said forward end of said body and secured thereto, a pin arranged longitudinally of said body and having one end extending through and slidably supported in said stationary disc and received within said bore and having the other end terminating in a line attaching eye, an adjustable concave disc circumposed about said pin and universally mounted thereon for movement into and out of a seating position in abutting and confronting relation with said stationary disc in response to the sliding movement of said pin, resilient means operatively connected to said pin for normally biasing the latter in a direction wherein said adjustable disc is in said seating position, and means carried by said adjustable disc and selectively engaging means provided in said stationary disc for detachably securing said adjustable disc in various positions of its universal movement.

3. A fish lure comprising an elongated body having an axial bore extending inwardly from the forward end thereof and terminating at a point contiguous thereto, a forwardly facing stationary concave disc disposed transversely of said forward end of said body and secured thereto, a pin arranged longitudinally of said body and having one end extending through and slidably supported in said stationary disc and received within said bore and having the other end terminating in a line attaching eye, an adjustable concave disc circumposed about said pin and universally mounted thereon for movement into and out of a seating position in abutting and confronting relation with said stationary disc in response to the sliding movement of said pin, resilient means operatively connected to said pin for normally biasing the latter in a direction wherein said adjustable disc is in said seating position, and means carried by said adjustable disc and selectively engaging means provided in said stationary disc for detachably securing said adjustable disc in various positions of its universal movement, the means on said stationary disc comprising a plurality of radially extending rows of spaced apertures provided in the confronting face of said stationary disc, and the means carried by said adjustable disc comprising a bead projecting from the confronting face of said adjustable disc and selectively engageable in the apertures of said radially extending rows.

GEORGE W. DAVIS.

REFERENCES CITED

The following references are of record in the file of this patent:

UNITED STATES PATENTS

| Number | Name | Date |
|---|---|---|
| 681,308 | Geen | Aug. 27, 1901 |
| 1,232,211 | Burkman | July 3, 1917 |
| 1,745,006 | Chapleau | Jan. 28, 1930 |
| 1,773,561 | Wethall | Aug. 19, 1930 |
| 1,842,591 | Dunkelberger | Jan. 26, 1932 |
| 2,008,004 | Catarau | July 16, 1935 |
| 2,134,330 | Fink | Oct. 25, 1938 |
| 2,482,309 | Wilson | Sept. 20, 1949 |
| 2,495,134 | Roberts | Jan. 17, 1950 |